J. H. CARR.
CONCRETE PIPE MACHINE.
APPLICATION FILED NOV. 2, 1915.
1,309,878.
Patented July 15, 1919.
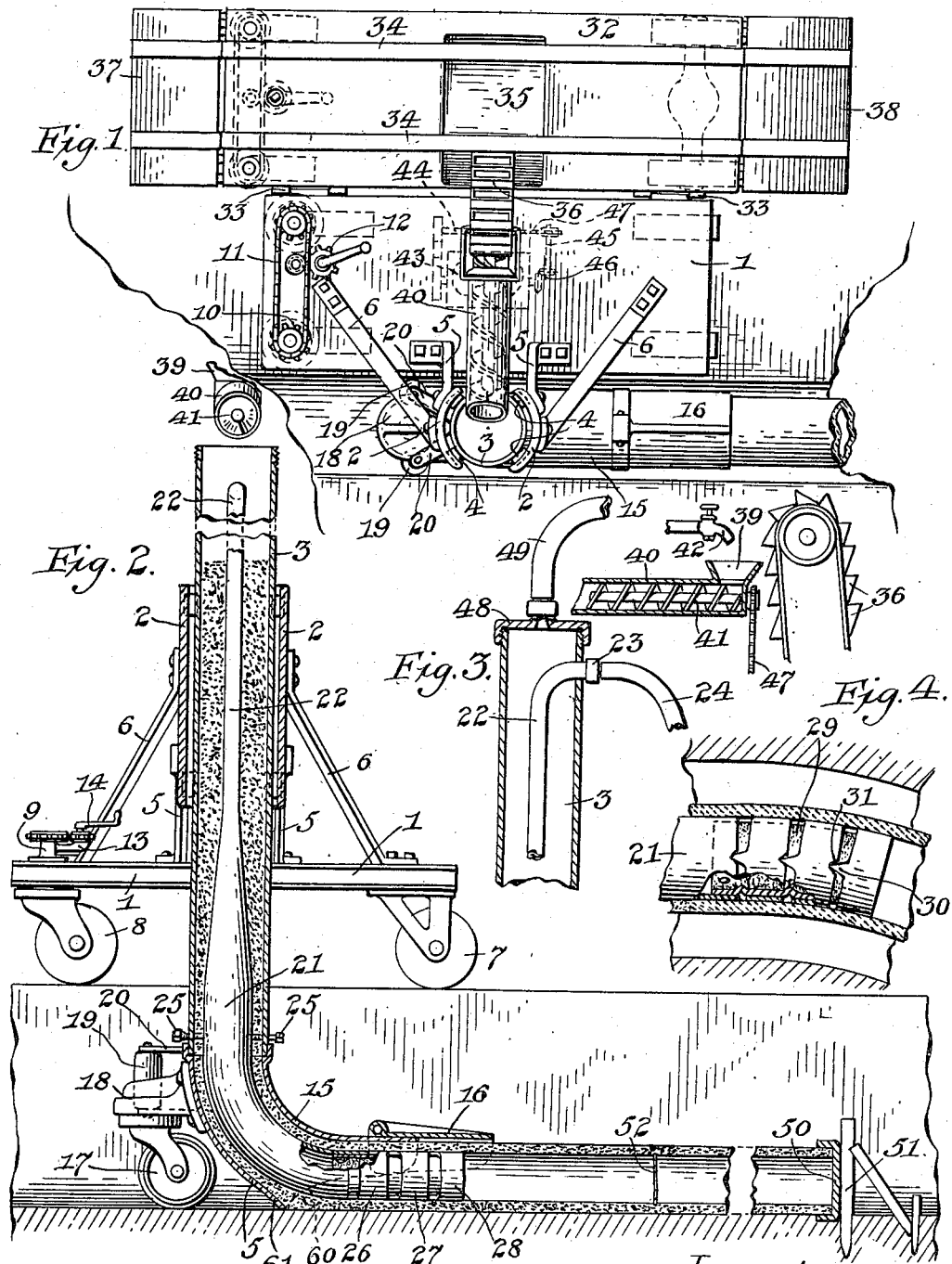
Witness:
Inventor:
John H. Carr,
By Cassell Severance
Attorney.

UNITED STATES PATENT OFFICE.

JOHN H. CARR, OF ALHAMBRA, CALIFORNIA.

CONCRETE-PIPE MACHINE.

1,309,878.  Specification of Letters Patent. Patented July 15, 1919.

Application filed November 2, 1915. Serial No. 59,171.

*To all whom it may concern:*

Be it known that I, JOHN H. CARR, a citizen of the United States, residing at Alhambra, in the county of Los Angeles and State of California, have invented certain new and useful Improvements in Concrete-Pipe Machines, of which the following is a specification.

This invention relates to improvements in pipe forming and laying machines and is particularly for the formation of cement concrete piping or other articles formed of material in plastic condition, which soon set and harden after their formation. The present invention is an improvement upon a former continuous pipe machine, which was patented to myself and Albert C. Routhe, jointly, September 14, 1915, the said patent bearing No. 1,153,599.

It is an object of the present invention to form and lay the piping and other material under pressure due to the action of gravity an internal pressure also being exerted as in the device of the former patent to maintain the piping in the shape in which it was formed.

It is also an object of the invention to provide a machine of the character described with outer and inner pipe forming tubes, the material for forming the piping to be placed between the two, and air pressure to be delivered through the inner tube. The outer pipe is also formed so that air pressure may be delivered into it, when necessary to clear the machine of all plastic material or the cement in its green state, whereby the machine will not become clogged when the process is discontinued for any length of time.

With these and other objects in view the invention comprises certain novel constructions, combinations and arrangements of parts as will be hereinafter more fully described and claimed. In the accompanying drawing forming a part of this specification—

Figure 1 is a top plan view of a machine embodying the features of the invention, illustrating the pipe forming and laying mechanism as extended into a ditch.

Fig. 2 is a vertical central sectional view taken through the pipe forming and laying tube or pipe.

Fig. 3 is a detail sectional view taken through the upper part of the pipe forming tube device and showing the mixing mechanism for preparing the materials that are shaped into the piping or other devices.

Fig. 4 is an enlarged fragmentary detail sectional view through the end of the inner piping of the laying mechanism showing flexible sections at that point for permitting the device to move about a curve.

The machine of the present invention is designed to make the formation and the laying of the pipe continuous, and accomplishing the same in a more effective manner than can be accomplished with the machine of the patent above referred to. In the device of the patent above referred to the green cement was fed into the shaping members of the mechanism by the positive action of a screw, so that it was very necessary that the machine move at a carefully regulated speed or there would be danger of the buckling of the piping forming, if the machine moved too slowly and of making weak portions in the piping if the machine moved too rapidly. With the mechanism of the present invention the weight of the green cement is caused to exert the pressure needed for shaping and laying the piping, so that the said pressure is automatically maintained and applied under the action of gravity. In the drawing the details and features of the invention have been fully illustrated and will now be described with reference to the said drawing, in which 1 is a vehicle or moving platform, having a vertically arranged pair of guiding members 2 suitably spaced apart to receive a vertical stand pipe 3. The said stand pipe 3 is made of any desired length, being preferably adapted to reach at its lower end into a ditch or excavation in which piping is to be laid, and to extend high enough at its upper end to contain a column of plastic or semi-liquid material sufficient to force the said material at the bottom of the stand pipe into the pipe shaping portions of the mechanism. The vertical guides 2 are usually approximately semi-cylindrical in form so as to fit quite closely to the outer contour of the stand pipe 3, roller bearings 4 however being interposed between said vertical guides and the surface of the stand pipe. The stand pipe is thus free to move up or down within the guides to accommodate itself to the depth of the excavation or trench in which the pipe is to be laid. The guides 2 are braced with respect to the platform 1 by one or more brace bars 5 and 6, the said bars overhanging one edge of the moving platform 1 as shown in the drawing so as to hold the stand pipe 3 over the ditch or excavation. The supporting parts of the machine thus travel along upon one side of the excavation as clearly shown in Fig. 1. The platform 1 may be provided with any suitable wheels as 7 and 8, the front wheels 8 being preferably mounted as casters, and having vertical stems 9 projecting upwardly through the platform and carrying sprocket wheels 10 at their upper ends. The endless sprocket chain 11 moves upon said sprocket wheels connecting them as shown in Fig. 1, so that when the sprocket chain is moved longitudinally it may be caused to turn the casters for directing the vehicle. An actuating sprocket wheel 12 may be employed and mounted upon a bracket 13, so that its teeth will engage the sprocket chain 11 and be capable of moving it. A hand lever or handle 14 is usually provided for turning the said sprocket wheel 12.

The lower end of the stand pipe 3 is connected with an elbow 15 which is curved so as to lead the pipe forming cement or concrete into horizontal position upon the bottom or floor of an excavation. The end of said elbow 15 is provided with a pivoted apron 16 adapted to overhang the piping in its plastic or green condition and guard the same from the falling of dirt, rocks or the like within the trench or excavation, a small amount of which is usually filled in, at this point to support the newly formed pipe at the sides. The lower end of the stand pipe 3 is movably supported by a caster at 17 preferably pivotally mounted in the bracket 18 which is secured to the upper portion of the elbow 15. The said caster 17 is preferably a broad wheel having more or less of a curved peripheral cross sectional shape, so as to approximately fit the curved bottom of a trench which is suitable for receiving piping. In order to keep the lower end of the stand pipe and the elbow 15 properly centered within the excavation or ditch, guiding rollers 19 are provided and carried by brackets 20 which are secured to the elbow 15 upon either side of the bracket 18. When the stand pipe has been lowered into a ditch the said rollers 19 by running upon the inner surface or walls of the ditch will guide the mechanism within the ditch.

In order that the elbow 15 and therefore the caster 17 shall not have to support the entire weight of the column of concrete in the stand pipe 3, the lower side of the elbow 15 is somewhat cut away at the bottom as shown in dotted lines in Fig. 2, at 60 and the wall of said elbow at 61 is straightened out, downwardly. In this way the weight of the concrete column is largely brought upon the ground, and the inner tube 21 will squeeze the said concrete into proper form on the curved bottom of the trench.

In the device of the present invention fluid pressure, as for instance compressed air is relied upon to prevent the green or plastic pipe from collapsing before it has become hardened within the ditch. In order to deliver the air within the piping as it is formed, an inner piping or tube 21 is employed and arranged with its axis coinciding with the axis of the stand pipe 3 and the elbow 15. The lower end of said tube 21 is thus curved and extended to the delivery end of the elbow 15. The upper portion of the tube 21 is preferably contracted, tapering to form a comparatively small pipe 22 at its upper end. Considerable space is thus afforded in the upper part of the standpipe 3 for the reception of plastic material, that is to be shaped into piping. The upper end of the pipe 22 is preferably turned to one side and allowed to project through an opening in the wall of the standpipe 3 where it may be connected by any suitable coupling 23 with an air supply pipe 24. The said supply pipe extends to any suitable source of compressed air or any storage receptacle containing the same, the pressure of the air delivered through the pipe and tube being just sufficient to keep the concrete pipe extended to its original shaping as it leaves the forming and laying device. The stand pipe 3 is carried high enough so that the weight of the material within the same will be ample to force the said material between the elbow 15 and the curved portion of the tube 21 in forming the pipe. A yielding pressure is always thus exerted, without the danger of any buckling in the pipe formed or the pulling apart or weakening of the said pipe at any points. The lower portion of the tube 21 is properly spaced from the standpipe 3 by means of holding and spacing screws 25 which are carried by the walls of the standpipe 3 and engage slight depressions formed in the surface of the tube 21.

In order that the forming of the piping may continue even where it is necessary to make a bend in the piping and in the ditch, flexible end sections 26, 27 and 28 are employed and held flexibly in position by an inner flexible tubing 29. Said tubing 29 may be of rubber, rubber fabric or other flexible material that will retain the air pressure employed in distending the concrete pipe. Projections 30 upon the articulating piping sections 26, 27 and 28 engaging notches 31, prevent the said sections from being drawn together by the yielding tubing 29. As shown in Fig. 4 the said sections may conform perfectly to the direction of the concrete piping as it is being laid in the ditch, without danger of weakening the piping at any point.

In order to facilitate the continuous operation of the device, a movable platform or vehicle 32 is provided and adapted to move parallel with the platform 1, hinge connections at 33 being preferably employed for holding the said platforms together. The platform 32 may be provided with drive or other wheels at the rear as indicated in dotted lines, and with guiding caster wheels at the front by which the platform may be directed, the construction of the caster wheels and the mechanism for controlling the same being like that described for guiding the platform 1. In this instance however, the sprocket wheels and chain, together with the actuating sprocket are arranged beneath the platform as indicated in dotted lines and the operating handle when applied passes through an aperture in the floor of the platform. The platform 32 is provided with ways 34 for receiving the wheels of vehicles, such as truck, cars or the like that may be employed for delivering sand, gravel, cement or other ingredients that may be used in making the concrete piping. The materials are dumped from the trucks or vehicles into a pit 35 formed centrally of the platform 32 where they may be reached by any suitable bucket, elevator or conveyer 36. The ends of the platform 32 are also provided with hinged platforms 37 and 38 to permit the vehicles to travel upwardly to the surface of the platform 32. The vehicles may thus run upon the platform at one end and off from the same at the other end as will be clearly understood by reference to Fig. 1 of the drawing. The elevator 36 carries the ingredients for the piping upwardly from the pit 35, dumping the said ingredients into a hopper 39 from which they fall into the casing 40 of a mixing device. The mixing of the materials is usually accomplished by a revolving conveyer screw 41 fitted within said casing 40. The discharge end of the casing 40 is arranged over the upper end of the standpipe 3 so that the materials are delivered in mixed condition in the said standpipe. A faucet 42 connected with a water supply is also preferably arranged so as to deliver the water necessary for the mixture into the said hopper 39. Any suitable means may be employed for operating the elevator 36 and the mixing screw 41 as for instance a suitable engine indicated in dotted lines at 43 and connected by belting with a shaft 44 of the elevator. A shaft indicated in dotted lines at 45 may be connected with the engine by bevel gears at 46 and with a mixing screw, by a sprocket chain 47, all in the usual well-known manner as commonly employed with such mechanisms.

In order to force all of the cement out of the standpipe 3 when the operation of the machine is to be stopped or discontinued for any length of time, a cap 48 may be screwed or otherwise upon the upper end of the standpipe 3 and connected with an air pipe 49. The cap 48 is apertured centrally so as to permit the passage of air from the pipe 49 into the standpipe 3 and in this way air under compression may be delivered into said standpipe for forcing all of the cement out at the bottom.

In operation the platform 1 together with the platform 32 moves along adjacent to a trench, ditch or excavation in which the piping is to be laid, being propelled in any desired manner. The front wheels of the two platforms being caster wheels, the movement of the said platforms will be directed so as to follow the ditch by the guide rollers 19 within the ditch. The lower end of the standpipe is thus always kept in properly centered position within the said ditch or excavation. The materials for forming the piping are dumped within the pit 35 and are carried up by the elevator 36 so as to be thrown into the hopper 39. Water is also introduced at this point and all of the ingredients or materials thus brought together, are mixed by the action of the conveyer screw 41 and delivered in proper condition into the upper end of the standpipe 3. The cap 48 is not in place during the operation of the mechanism. The weight of the column of materials in the standpipe 3 will cause them to pass downwardly through the elbow 15 and outwardly upon the floor of the trench or excavation in cylindrical form. Air pressure is introduced through the tube 21 so as to support the walls of the fresh laid pipe. The end of the pipe is closed for holding said pressure, usually by the application of a cap 50 to the end of the pipe just formed, the said cap being supported in proper position by any suitable means as for instance a suitable propped stake 51, illustrated in Fig. 2 of the drawing. The air pressure cannot escape from the newly formed pipe and being maintained at a sufficient degree to prevent the collapsing of said pipe, permits of the piping being continuously made as the machine moves forwardly. If it is desired to stop the operation of the machine before the required amount of piping has been laid, a fragile partition 52 may be set in place where the next operation is to begin. A tough paper of suitable strength may be set in the plastic cement when the operation is to be discontinued, as shown at 52 and the setting of the cement around the edges thereof will hold it in place. When the operation of forming the piping is to continue, the fragile partition thus formed will be sufficient to hold the light air pressure required to keep the pipe in distended form. Such partition will not cause permanent obstruction in the pipe for the first delivery of water through the pipe will break down the said partition. Of course the whole length of the piping may be filled with air pressure again without the use of such intermediate partitions 52 if desired. When it is desired to stop forming and laying pipe it is necessary that all of the cement mixture be carried out of the standpipe and elbow 15, before the same hardens therein. For this purpose the cap 48 is fastened in place and air pressure is turned into the standpipe 3, sufficient to push all of the cement out at the end of the elbow 15, the pipe forming and laying continuing until all of the plastic material has been forced out of the machine. The machine is thus cleared of any obstructions and the cement cannot set and harden therein to interfere with its further use. The operation of the machine will be readily understood from the above description and it will be evident that the minor details of construction in the device may be altered and mechanical equivalents applied in lieu thereof without departing in the least from the spirit of the invention.

It will be noted that when the vehicles travel upwardly upon the platform 32 that the forward movement of the apparatus will be necessarily arrested for a short time, or until the vehicle has discharged its load and passed off from the platform. The movement of the platform is slow, to adapt the mechanism to the formation of the piping in the excavation. The height of the standpipe 3 is sufficient to allow for the column of materials therein, rising to a higher point during the intermittent stops, occasioned by the passage of the vehicles over the said platform 32. The height of the column will of course be lowered again as the temporary stopping of the apparatus has ceased and the device is moving forward again. This slight fluctuation of the height of the concrete column in the pipe 3 does not make any material difference in the pressure exerted upon the piping which is being shaped and formed.

What is claimed is:

A machine of the class described having a standpipe movably supported in vertical position and having a shaping elbow at its lower end, an inner forming tube extending through the central portion of said standpipe and elbow and connected with a source of compressed air, the plastic or soft concrete standing in the pipe exerting a pressure for driving the materials out into the form of a pipe from between the said elbow and shaping tube, a cap adapted to be applied to the upper end of said standpipe and having a connection with a source of compressed air, whereby air may be introduced between the standpipe and the inner forming tube for clearing the mechanism of green cement when the pipe forming operation is discontinued.

In testimony whereof I have hereunto set my hand in presence of two witnesses.

JOHN H. CARR.

Witnesses:
CASSELL SEVERANCE,
EARLE R. POLLARD.

Copies of this patent may be obtained for five cents each, by addressing the "Commissioner of Patents, Washington, D. C."